United States Patent
Xu

(10) Patent No.: US 8,276,199 B2
(45) Date of Patent: Sep. 25, 2012

(54) METHOD AND DEVICE FOR SECURE TEST PORT AUTHENTICATION

(75) Inventor: Zheng Xu, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 658 days.

(21) Appl. No.: 12/421,291

(22) Filed: Apr. 9, 2009

(65) Prior Publication Data

US 2010/0263043 A1    Oct. 14, 2010

(51) Int. Cl.
*G06F 21/00* (2006.01)
(52) U.S. Cl. ........................................ 726/17
(58) Field of Classification Search .............. 726/17
See application file for complete search history.

(56) References Cited

U.S. PATENT DOCUMENTS

| | | | |
|---|---|---|---|
| 6,041,406 A * | 3/2000 | Mann ............................ | 712/227 |
| 6,142,683 A * | 11/2000 | Madduri ...................... | 717/128 |
| 6,813,739 B1 * | 11/2004 | Grannis, III ................. | 714/729 |
| 7,117,352 B1 * | 10/2006 | Giles et al. ................... | 713/2 |
| 7,277,972 B2 | 10/2007 | Moyer et al. | |
| 7,600,166 B1 * | 10/2009 | Dunn et al. .................... | 714/726 |
| 7,634,701 B2 * | 12/2009 | Morgan et al. ................ | 714/726 |
| 7,886,150 B2 * | 2/2011 | Stollon et al. ................. | 713/171 |
| 7,906,983 B2 * | 3/2011 | Fulks, III ......................... | 326/8 |
| 2005/0193220 A1 | 9/2005 | Little et al. | |
| 2007/0033454 A1 * | 2/2007 | Moss et al. .................... | 714/724 |
| 2007/0094507 A1 * | 4/2007 | Rush ............................. | 713/176 |
| 2008/0098224 A1 | 4/2008 | Hui et al. | |
| 2008/0148118 A1 * | 6/2008 | Morgan et al. ............... | 714/726 |
| 2008/0282087 A1 * | 11/2008 | Stollon et al. ................ | 713/171 |
| 2009/0113210 A1 * | 4/2009 | Westerinen et al. .......... | 713/187 |
| 2009/0276844 A1 * | 11/2009 | Gehrmann et al. ............ | 726/16 |
| 2010/0141295 A1 * | 6/2010 | Fulks, III ......................... | 326/8 |

FOREIGN PATENT DOCUMENTS

WO    2005020280 A2    3/2005

* cited by examiner

*Primary Examiner* — Oscar Louie

(57) ABSTRACT

A device includes a first test port coupled to a first test device, a second test port coupled to a second test device, a resource, and a security controller coupled to the first and second test ports. The security controller is operable to authenticate the first test device prior to authenticating the second test device, and, in response to authenticating the first test device, permit the first and second test devices to access the first resource.

18 Claims, 5 Drawing Sheets

METHOD AND DEVICE FOR SECURE TEST PORT AUTHENTICATION

FIELD OF THE DISCLOSURE

The present disclosure is related generally to electronic devices, and is more particularly related to authenticating debug access to electronic devices.

BACKGROUND

An electronic device, such as an integrated circuit device, can include one or more debug ports that permit external devices to access the electronic device. Such external devices can access the electronic device to perform manufacturing tests, such as integrated circuit device validation or quality assurance by external testers, or to permit debug activities, such as stopping and starting program execution, reading control registers, and enabling various debug features of an integrated circuit device by a debug tool. As such, an external device coupled to the debug port of an electronic device often has the ability to access the internal architecture of a device access information such as device microcode and the contents of registers in the electronic device. However, the details of the internal architecture and information stored at the device are typically proprietary to manufacturers and users of the electronic device. Therefore, it can be desirable to limit the ability to access an electronic device by an external device, and restrictions are often placed on electronic devices to limit the ability to access information stored at such an electronic device.

An electronic device can include debug ports that implement associated techniques for authenticating a debug port of the electronic device to allow external devices access resources of the electronic device. For example, a debug port can include an authentication controller that is used to authenticate requests from external devices.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In accordance with a specific embodiment, authorization requests from test devices access a common authentication module memory mapped at an integrated circuit device. The authentication module facilitates authentication operations to authenticate access requests from the test devices for resources of the data processing device, thereby ensuring that the requesting devices only access authorized resources. Various embodiment of the present disclosure will be better understood with reference to the specific embodiments illustrated at FIGS. 1-8.

Figure 1:
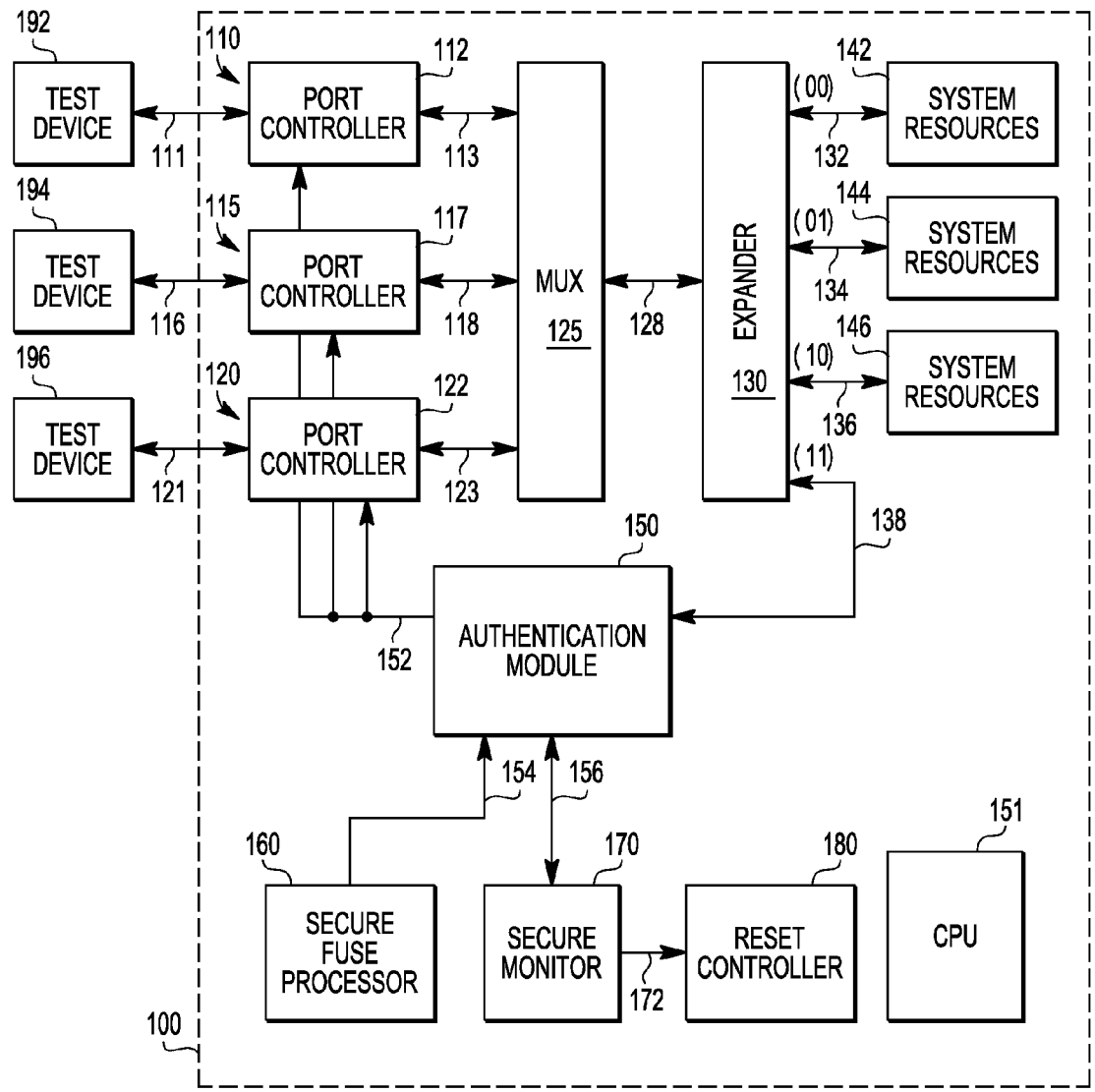
FIG. 1 is a block diagram illustrating an embodiment of a data processing device.

FIG. 1 illustrates a system including a data processing device 100, a test device 192, a test device 194, and a test device 196. Data processing device 100 includes a debug port 110, a debut port 115, a debug port 120, a multiplexer module 125, an expander module 130, system resources 142, system resources 144, system resources 146, authentication module 150, a central processing unit (CPU) 151, a secure fuse processor 160, a secure monitor 170, and a reset controller 180. Data processing device 100 is connected to test devices 192, 194, and 196.

Debug port 110 includes interconnects 111 and 113, and port controller 112. Test device 192 is connected to interconnect 111. Port controller 112 is connected to interconnect 111, to interconnect 113, and to interconnect 152. Debug port 115 includes interconnects 116 and 118, and port controller 117. Test device 194 is connected to interconnect 116. Port controller 117 is connected to interconnect 116, interconnect 118, and to interconnect 152. Debug port 120 includes interconnects 121 and 123, and port controller 122. Test device 192 is connected to interconnect 121. Port controller 122 is connected to interconnect 121, interconnect 123, and to interconnect 152.

Multiplexer module 125 is connected to interconnect 113, interconnect 118, interconnect 123, and to interconnect 128. Expander module 130 is connected to interconnect 128, interconnect 132, interconnect 134, interconnect 136, and to interconnect 138. System resources 142 are connected to interconnect 132. System resources 144 are connected to interconnect 134. System resources 146 are connected to interconnect 136. Authentication module 150 is connected to interconnect 138, interconnect 152, interconnect 154, and to interconnect 156. Secure fuse processor 160 is connected to interconnect 154. Secure monitor 170 is connected to interconnect 156, and to interconnect 172. Reset controller 180 is connected to interconnect 172.

Test device 192 can be a tester that is used to verify proper operation of the data processing device, a debug tool used to monitor data processing device 100 during operation, and the like. In operation, debug port 110 functions to permit test device 192 to access resources in data processing device 100. In particular, port controller 112 communicates with test device 192 in a format that is suitable to a particular type of debug port 110. In one embodiment, port controller 112 detects the presence of test device 192 through a hardware handshake over interconnect 111 initiated by port controller 112. In another embodiment, port controller 112 detects the presence of test device 192 in response to a request issued to port controller 112 by test device 192.

Requests from test device 192 can include commands, address information, and data information, such as would be typical of a write access request, or a read access request, the like, and combinations thereof. When a request includes address information, the address information can refer to an address that is address mapped to a local resource of port controller 112. The address map of the local resource is referred to as the "debug port address map." Alternatively, the address information can refer to an address map that includes system resources 142, 144, and 146, which are also referred to herein as system resources 142 through 146), and authentication module 150. Note that system resources 142 through 146 represent various resources that are address mapped such that they can be accessed by interconnects 132, 134, and 136, respectively. The resources that can be accessed by the expander are mapped to an address map referred to as the "expander address map".

Information received from test device 192 can directly identify addresses at the expander address map, or can include information that is translated by the port controller 112 to identify addresses of the expander address map that are associated with resources to be accessed. For example, when port controller 112 desires to access a resource that is mapped to the expander address map, the address information is provided at interconnect 112 identifying the specific resources of the data processing device 100 that are the target of an access request.

In one embodiment, debug port 110 can represent a System Access Port (SAP) test interconnect in accordance with the Institute of Electrical and Electronics Engineers (IEEE) Test Access Port and Boundary Scan Architecture standard 1149.1, commonly known as a Joint Test Action Group (JTAG) port. As such, port controller 112 receives requests from test device 192 in a serial bit stream that is compliant with the JTAG protocol. When a received request from test device 192 includes address information that refers to an address at the debug port address map, the request will be initially handled using the locally addressed resource. For example, information can be serially loaded and stored at a register of debug port 112. This information can include address information corresponding to the expander address map. In response to this address information being stored locally to port controller 112, a subsequent command, such as a debug command, received at the debug controller 112, can result in the port controller 112 issuing an access operation at port 113 that is based on the received address information to access one of system resources 142 through 146. Note that a specific resource can be member of more than one of the system resources 142, 144, and 146. For example, a control register of CPU 151 can be a member of system resources 142 and a member of system resources 144, and therefore can be mapped to multiple memory map locations accessible through interconnect 132 or through an address location mapped to interconnect 134

Figure 2:
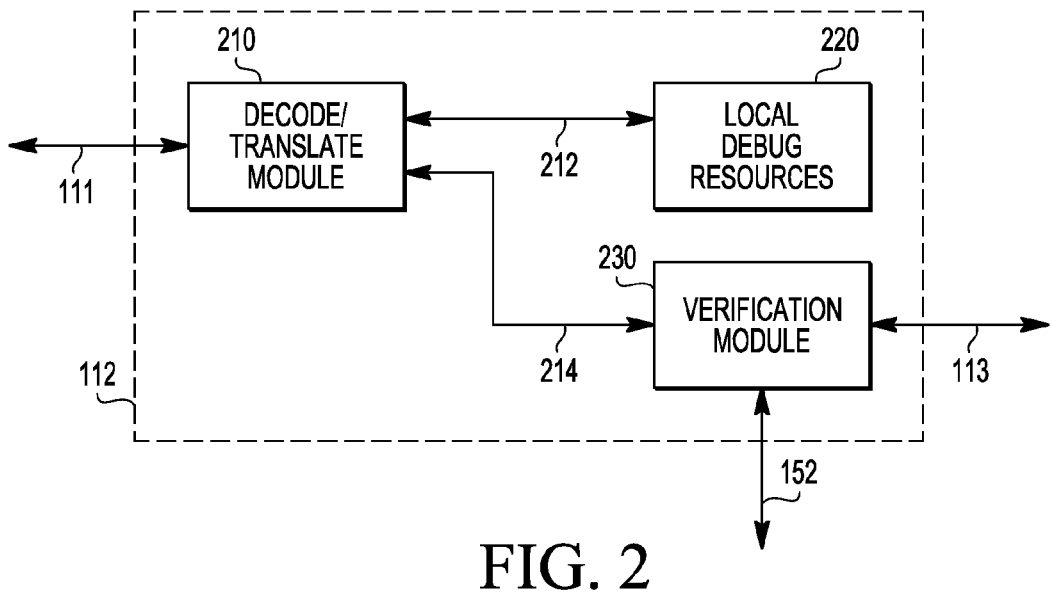
FIG. 2 is a block diagram illustrating an embodiment of a port controller.

FIG. 2 illustrates a specific embodiment of port controller 112, that includes a decode/translate module 210, local resources 220, and a verification module 230. Decode/translate module 210 is connected to interconnect 111, to a port controller local bus 212, and to a port controller system bus 214. Local resources 220 are connected to port controller local bus 212. Verification module 230 is connected to port controller system bus 214, to interconnect 128, and to interconnect 152. During operation, decode/translate module 210 determines if a request received on interconnect 111 is targeted to local resources 220 or to the resources associated with the expander address map. If the request is targeted to local resources 220, then decode/translate module 210 routes the request to the targeted resource in local resources 220. Local resources 220 can include default access information, e.g., device identification information, firmware or microcode revision level information, that is accessible to test device 192 without first being authenticated by data processing device 100.

Alternatively, if a request is targeted to system resources 142 through 146, or to authentication module 150, then decode/translate module 210 routes the request to verification module 230. In a particular embodiment, decode/translate module 210 can provide information received from test device 192 to verification module 230 in a different format than it is received. For example, decode/translate module 210 can function to translate requests received at interconnect 111 that are associated with local resources 220 to a format used by local resources 220, and vice versa. Likewise, decode/translate module 210 can function to translate received requests that are associated with system resources 142 through 146, and authentication module 150 from the serial bit stream or local debug resources 220 to the format used by interface 214, and subsequently interface 113, and vice versa.

Figure 3:
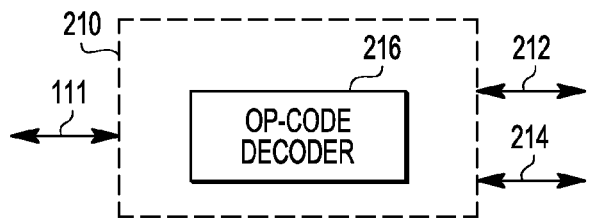
FIGS. 3-5 are block diagrams illustrating different embodiments of a decode/translate module.

FIG. 3 illustrates an embodiment of decode/translate module 210 that includes an op-code decoder 216. Here the signal received by decode/translate module 210 from the test device on interconnect 111 includes an instruction (e.g., an op-code) that needs to be decoded to determine a destination address. The instruction is decoded into appropriate control and address signals that are provided to either port controller local bus 212, or to port controller system bus 214. If the instruction decodes to an address in local debug resources 220, then op-code decoder 216 provides the necessary address signal, control signal, and data signal on port controller local bus 212 to access local debug resources 220. If the instruction decodes to an address in system resources 142, 144, 146, and 150 then op-code decoder 216 provides the necessary address signal, control signal, and data signal on port controller system bus 214 to access local debug resources 220. For example, an op-code referred to as "AUTH" can be received from a test device that is decoded into an access request of authentication module 150 that initiates an authentication sequence.

Figure 4:
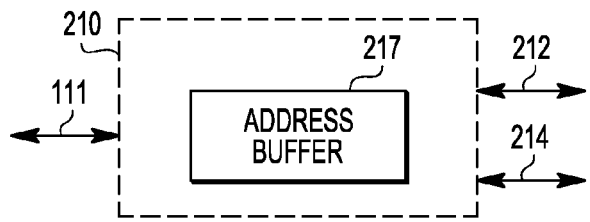

FIG. 4 illustrates another embodiment of decode/translate module 210 that includes an address buffer 217. Here the signal received by decode/translate module 210 on interconnect 111 includes a request address. The request address is received by address buffer 217, and depending on whether the request address refers to local debug resources 220, or to system resources 142, 144, 146, or authentication module 150, address buffer 217 will either forward the request on port controller local bus 212 to local debug resources 220, or on port controller system bus 214 to verification module 230.

Figure 5:
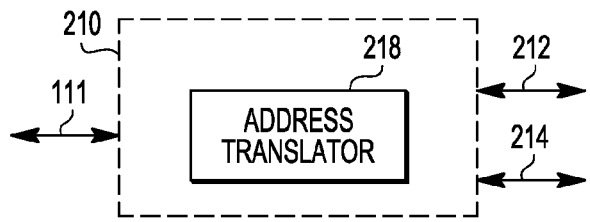

FIG. 5 illustrates another embodiment of decode/translate module 210 that includes an address translator 218. Here the signal received by decode/translate module 210 on interconnect 111 includes a request address. The request is received by address translator 218 and translated to a different address before being forwarded. If the request address refers to local debug resources 220, address translator 218 will forward the translated request on port controller local bus 212 to local debug resources 220. If the request address refers to system resources 142, 144, 146, or authentication module 150, the address translator 218 will forward the translated request on port controller system bus 214 to local debug resources 220. Note that, in a particular embodiment, decode/translate module 210 can include op-code decoder 216, address buffer 217, and address translator 218, or any combination thereof.

Figure 6:
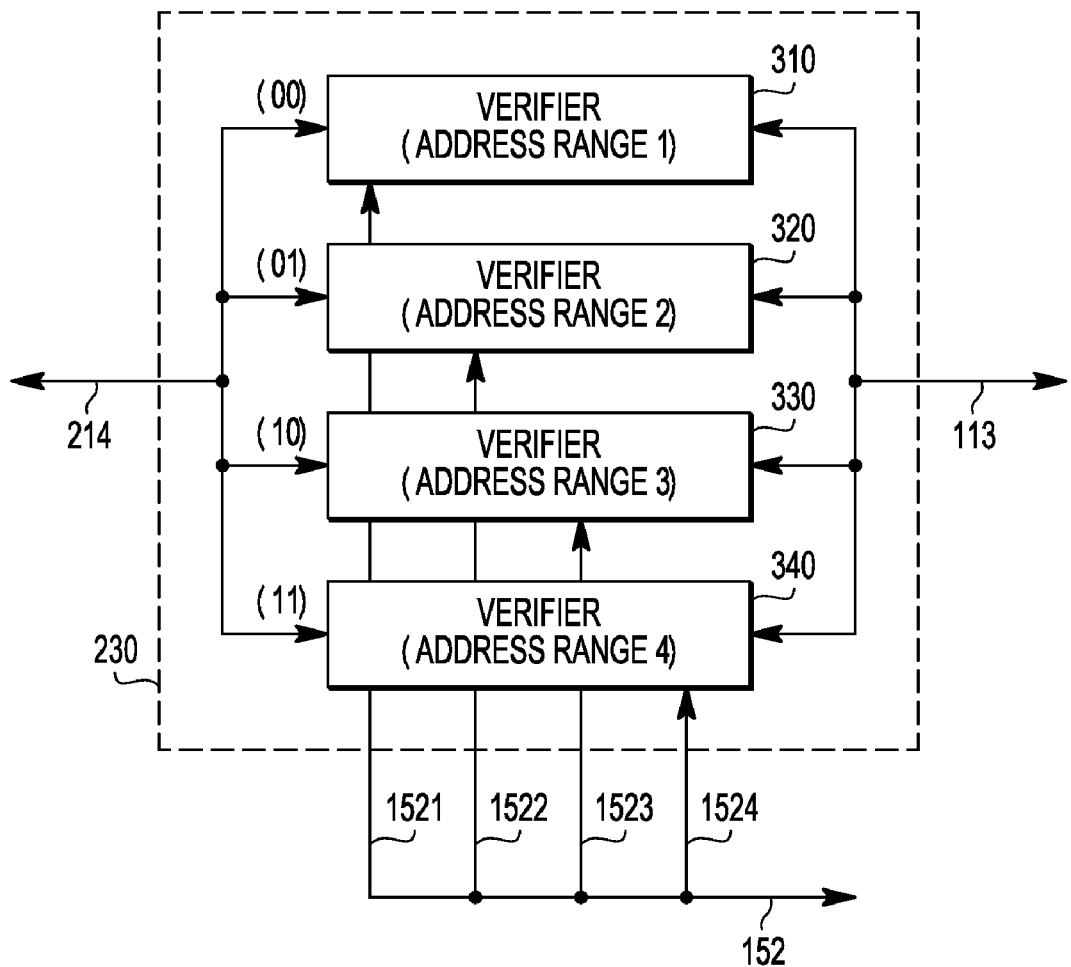
FIG. 6 is a block diagram illustrating an embodiment of a verification module.

FIG. 6 illustrates verification module 230 including multiple verifiers, including a verifier 310, a verifier 320, a verifier 330, and a verifier 340. Verifier 310 is connected to port controller system bus 214, to interconnect 113, and to interconnect 1521. Verifier 320 is connected to port controller system bus 214, to interconnect 113, and to interconnect 1522. Verifier 330 is connected to port controller system bus 214, to interconnect 113, and to interconnect 1523. Verifier 340 is connected to port controller system bus 214, to interconnect 113, and to interconnect 1524. Interconnects 1521 through 1524 are interconnects associated with interface 152.

In a particular embodiment, the address information in a request received at a verifier over port controller system bus 214 is 18-bits long [17:0], and verification module 230 authenticates requests based upon the two most significant bits [17:16] of the address information (2-MSB). Thus, when decode/translate module 210 routes a request to verification module 230, requests with the 2-MSB equal to "00" are routed to verifier 310, requests with the 2-MSB equal to "01" are routed to verifier 320, requests with the 2-MSB equal to "10" are routed to verifier 330, and requests with the 2-MSB equal to "11" are routed to verifier 340. Requests handled by verifier 310 will either be forwarded to interconnect 128, or be blocked from being forwarded to interconnect 128, based upon the state of interconnect 1521. Requests received by verifier 320 from port controller system bus 214 will either be forwarded or blocked, based upon the state of interconnect 1522. Requests handled by verifier 330 from port controller system bus 214 will either be forwarded or blocked, based upon the state of interconnect 1523. Requests received by verifier 340 from port controller system bus 214 will either be forwarded or blocked, based upon the state of interconnect 1524. Requests that are forwarded from verifiers 310 through 340 are either formatted prior to being received at respective verifiers, or formatted as necessary by respective verifiers prior to being provided to interconnect 113 for further downstream processing.

In operation, debug ports 115 and 120 function similarly to debug port 110. In particular, a decode/translate module or each respective port determines if a request is targeted to a local resource or to the resources associated with the expander address map, and forwards the request to either the local resource or to a verification module. Requests that are forwarded to a verification module are either forwarded to multiplexer module 125, or blocked by a verifier based upon the state of a particular verification signal from interface 152.

In a particular embodiment, debug port 115 includes a Nexus Port Controller (NPC) test interconnect in accordance with the IEEE Industry Standards and Technology Organization (ISTO) standard 5001, commonly known as a Nexus port. As such, port controller 117 receives requests from test device 194 in a packet based protocol, collects the information packets, forms the packets into requests, and forwards the requests to multiplexer module 125. Likewise, port controller 117 receives requests from multiplexer module 125, forms the requests into packets, and sends the packets to test device 194 via external test interconnect 116.

In a particular embodiment, debug port 120 includes a proprietary system functional debug port. As such, external test interconnect 121 is a parallel bus structure, and port controller 122 receives requests from test device 196 in a parallel format that can be similar to the format of interconnect 123 allowing requests to pass from test device 196 to multiplexer module 125 without translation. In this embodiment, port controller 122 can include data buffers, or direct links between interconnect 121 and interconnect 123. Likewise, port controller 122 can either buffer requests received from multiplexer module 125, or send requests directly to test device 196.

Multiplexer module 125 receives requests from port controller 112, from port controller 117, and from port controller 122, and multiplexes the requests to expander 130. Multiplexer module 125 also receives requests from expander 130 that are demultiplexed and provided to port controllers 112, 117, and 122. As noted above, a request routed to multiplexer module 125 from one of the debug ports includes address information that identifies an address-mapped resource of data processing device 100 that is the target of the request. For example, a particular address in the expander address map corresponding to system resources 142 can correspond to a control register that controls the behavior of CPU 151. Thus, by issuing a request identifying the address-mapped location of this control register within system resources 142, a test device can access the control register information through its respective debug port. In another example, a different address mapped location in the expander address map can correspond to a status register, which can be accessed to read status information for CPU 151. Another address mapped location can correspond to a run control register that permits the user of test device 192, 194, or 196 to stop and start execution of program code within data processing device 100.

Expander module 130 receives requests from multiplexer module 125, and routes them to various resources based upon the associated address information. As discussed above, in a particular embodiment, the address information in a request is 18-bits long [17:0], and expander module 130 routes requests based upon the two most significant bits [17:16] of the address information (2-MSB). Table 1 illustrates how expander module 130 routes requests. Requests addressed to the address space with the 2-MSB equal to "00" are routed by the expander 130 to access system resources 142. Requests addressed to the address space with the 2-MSB equal to "01" are routed by the expander 130 to access system resources 144. Requests addressed to the address space with the 2-MSB equal to "10" are routed by the expander 130 to access system resources 146. System resources 146 provides test devices 192, 194, and 196 access to a vector test space. Requests addressed to the address space with the 2-MSB equal to "11" are routed by the expander 130 to access authentication module 150.

TABLE 1

Request Routing in the Expander Module

| Addr. [17:16] | Interconnect | Resources |
|---|---|---|
| 00 | Interconnect (132) | System Resources (142) |
| 01 | Interconnect (134) | System Resources (144) |
| 10 | Interconnect (136) | System Resources (142) |
| 11 | Interconnect (138) | Authentication module (150) |

It will be appreciated that a specific resource of data processing device 100 can be a member of more than one of the system resources 142, 144, and 146. For example, system resources 142 can be resources that are accessed using a common bus represented by interconnect 132. In one embodiment, this bus can be the same bus that is used by data processing device 100 during normal operation to access system resources 142. Therefore, accesses to system resources 142 are intrusive on the bus bandwidth used during normal operation of data processing device 100 in that it needs to arbitrate for a shared resource, e.g., the common bus. In response to a request from one of the debug ports to access system resources 144, expander 130 arbitrates to access information at interconnect 134. System resources 144 can be resources that are accessed using a non-intrusive debug bus, e.g., a bus that accesses resources over a dedicated bus e.g., interconnect 134, separate from the bus used to access system resources 142. Therefore, a resource of the data processing device 100, such as a register of CPU 151, can be a member of both system resources 142 and system resources 144.

Authentication module 150 operates to authenticate test devices 192, 194, and 196 onto data processing device 100 through their respective debug ports, to ensure that test devices 192, 194, and 196 are authorized to access the resources of data processing device 100. The authentication operation of the memory mapped authentication module 150 can authenticate the level of access (e.g., which resources can be accessed) that is granted to test devices 192, 194, and 196. Authentication module 150 also detects when an unauthorized test device 192, 194, or 196 attempts to access the resources of data processing device 100, and protects data processing device 100 from such unauthorized test devices.

Authentication module 150 can also function to determine a default access level that is to be granted to test devices 192, 194, and 196 at power on. As such, when system power is turned on, authentication module 150 reads a default word from secure fuse processor 160 that defines whether or not to grant default access to test devices 192, 194, and 194, and if so, which system resources 142, 144, and 146, and authentication module 150 are authenticated. The default word can be one time programmable with the default access levels. In a particular embodiment, the default word can define that all test devices 192, 194, and 196 have access to all system resources 142, 144, and 146, and authentication module 150. In another embodiment, the default word can define that no test device 192, 194, or 196 is granted access to any of system resources 142, 144, or 146, or to authentication module 150. In another embodiment, the default word can define a combination of test devices 192, 194, and 196 to be granted access to a combination of system resources 142, 144, 146, and authentication module 150.

Consider the case when test device 192 is not authenticated onto data processing device 100, port controller 112 issues an authentication request through multiplexer module 125 to expander module 130 that is memory mapped to authentication module 150. The authentication request can be in response to an "AUTHENTICATE" command from test device 192, in response to an access request from test device 192, in response to port controller 112 detecting that test device 192 is connected, and the like. For example, an "AUTHENTICATE" command can be decoded at port controller 112, which provides a memory mapped request at interconnect 123. Alternatively, an access request from test device 192 can provide the memory mapped request to port controller 112, which provides the memory mapped information along at interconnect 123. Either way, a request from port controller 112 results in a memory mapped access request associated with an address having a 2-MSB equal to "11", such that the request is handled by authentication module 150. In one embodiment, an address is provided at interconnect 138 that is decoded by authentication module 150 to begin the authentication process. In another embodiment, the address received at expander 130 from interconnect 128 is decoded to initiate the authentication process by selecting the authentication module 150.

According to one embodiment, upon receiving the authentication request, authentication module 150 reads a challenge word from secure fuse processor 160 and issues a challenge request back to test device 192 that includes the challenge word. Test device 192 in turn issues a response request that is address mapped to authentication module 150 that includes a response word. Authentication module 150 compares the response word with an authentic response word from secure fuse processor 160. In a particular embodiment, secure fuse processor 160 includes the challenge word and more than one authentic response word, coded into a write-once non-volatile memory. In another embodiment, the challenge word and the authentic response word are 64-bits long.

TABLE 2

| Word | Secure Fuse Processor | | |
|---|---|---|---|
| | Requesting Port | Authenticated Port | Authenticated Resource |
| Default | N/A | Programmable | Programmable |
| Challenge | N/A | N/A | N/A |
| Response_1 | 110 | 110 | 142 |
| | 115 | None | Fail To Authenticate |
| | 120 | None | Fail To Authenticate |
| Response_2 | 110 | 110 | 144 |
| | 115 | 115 | 144 |
| | 120 | None | Fail To Authenticate |

TABLE 2-continued

| Word | Secure Fuse Processor | | |
|---|---|---|---|
| | Requesting Port | Authenticated Port | Authenticated Resource |
| Response_3 | 110 | 110 | 144 |
| | | 115 | 144 |
| | 115 | 110 | 144 |
| | | 115 | 144 |
| | 120 | None | Fail To Authenticate |
| Response_4 | 110 | 110 | 142, 144 |
| | | 115 | 144 |
| | 115 | 110 | 142, 144 |
| | | 115 | 144 |
| | 120 | None | Fail To Authenticate |
| Response_5 | 110 | None | Fail To Authenticate |
| | 115 | None | Fail To Authenticate |
| | 120 | 120 | 142, 144, 146 |
| . . . | . . . | . . . | . . . |
| Response_N | . . . | . . . | . . . |

Table 2 illustrates the default word at the first row of column 1, the challenge word at the second row of column 1, and authentic response words Response_1-Response_N at the remaining rows of column 1 that are stored in secure fuse processor 160. For each authentic response words, labeled Response_1-Response_N, an entry is provided at column 2 indicating which port 110, 115, or 120 issued the response request. For each entry at column 2, a list of which ports 110, 115, or 120 are authenticated by receipt of the particular authentic response word is listed at column 3, and which system resources 142, 144, or 146 are accessible by an authenticated port is listed at column 4. When test device 192, 194, or 196 issues a response request, authentication module 150 compares a response word from the response request with each of the possible response words 1 through N. If the response word received from test device 192, 194, or 196 matches one of the authentic response words 1 through N, then authentication module 150 authenticates the particular test device 192, 194, or 196 by providing authentication information to an associated port 110, 115, or 120 via interconnect 152 that indicates that indicates which of resources 142, 144, and 146 can be accessed.

For example, according to the first entry for the word Response_1, if test device 192 issues a response request to port 110 that includes word Response_1, then port 110 is authenticated to access system resources 142. However, according to the second and third entries for Response_1, authentic response word Response_1 is an invalid response with respect to authentication of ports 115 and 120, and if either of test devices 194 or 196 issue a response request that includes Response_1, then the associated port 115 or 120 will fail to authenticate, and access to system resources 142 is not authenticated at debug ports 115 and 120. In this way, authentication based on Response_1 functions to permit only port 110 to access system resources 142.

Similarly, word Response_2 functions to permit ports 110 and 115 to access system resources 144, and is an invalid response request with respect to port 120. However, ports 110 and 115 are authenticated individually. That is, when test device 192 issues a response request using port 110 that includes Response_2, then port 110, and only port 110 is authenticated to access system resources 144. Similarly, when test device 194 issues a response request using port 115 that includes Response_2, then port 115, and only port 115 is authenticated to access system resources 144.

When Response_3 is provided to the authentication module 150 using port 110 multiple ports are authenticated to access resources 144 in response to only one port actually. Specifically, both ports 110 and 115 are authenticated to access resources 144 in response to either port 110 or port 115 returning Response_3, e.g., the ports are authenticated together in response to Response_3 being the authentication response. Note that Response_3 is an invalid response with respect to port 120.

Response_4 functions to permit port 110 to access system resources 142 and 144, and to permit port 115 to access system resources 144. Thus, when test device 192 issues a response request that includes Response_4, then port 110 is authenticated to access system resources 142 and 144, and port 115 is authenticated to access system resources 144. Likewise, when test device 194 issues a response request that includes Response_4, then port 110 is authenticated to access system resources 142 and 144, and port 115 is authenticated to access system resources 144. Note that Response_4 is also an invalid response with respect to port 120.

Response_5 functions to permit port 120 to access system resources 142, 144, and 146. Thus, when test device 196 issues a response request that includes Response_5, port 120 is authenticated to access system resources 142, 144 and 196. Response_5 is an invalid response with respect to ports 110 and 115. After reading this specification, skilled artisans will appreciate that other combinations of access between debug ports 192, 194, and 196, and resources as accessed by system resources 142, system resources 144, system resources 146, and authentication module 150 can be used, as indicated by the other authentic response words.

When a response word received from test device 192, 194, or 196 fails to match an authentic response word from secure fuse processor 160, or provides an invalid response word for the associated test device 192, 194, or 196, then authentication module 150 will not authenticate their access at their associated port controllers. The authentication module 150 can take steps to prevent access to associated port controller 112, 117, or 122 by indicating to test device 192, 194, or 196 that authentication is not permitted. For example, further authentication requests may not be forwarded to authentication module 150. Alternatively, authentication module 150 need not provide any authentication information to the port controllers 112, 117, and 122 via port control interconnect 152.

When test device 192, 194, or 196 fails to authenticate, authentication module 150 can send an indication to secure monitor 170 that there has been a failure to authenticate test device 192, 194, or 196 onto data processing device 100. Secure monitor 170 includes a non-volatile memory resource. Secure monitor 170 collects the sum total of the number of authentication failures. Authentication module 150 reads the sum total of the number of authentication failures. When the sum total exceeds a predetermined threshold value, for example three authentication failures, authentication module 150 indicates to port controllers 112, 117, and 122 that the threshold value has been reached and that controllers 112, 117, and 122 should stop forwarding requests from test devices 192, 194, and 196 to data processing device 100 until such time as data processing device 100 is reset. When the sum total exceeds the predetermined threshold value, secure monitor 170 sends a request via interconnect 172 to reset controller 180, and reset controller 180 initiates a system reset. In this way, secure monitor 170 detects brute force attacks on data processing device 100. In another embodiment (not illustrated), authentication module 150 determines if the predetermined threshold value is reached and sends a request to reset controller 180, and reset controller 180 initiates a system reset.

Figure 7:
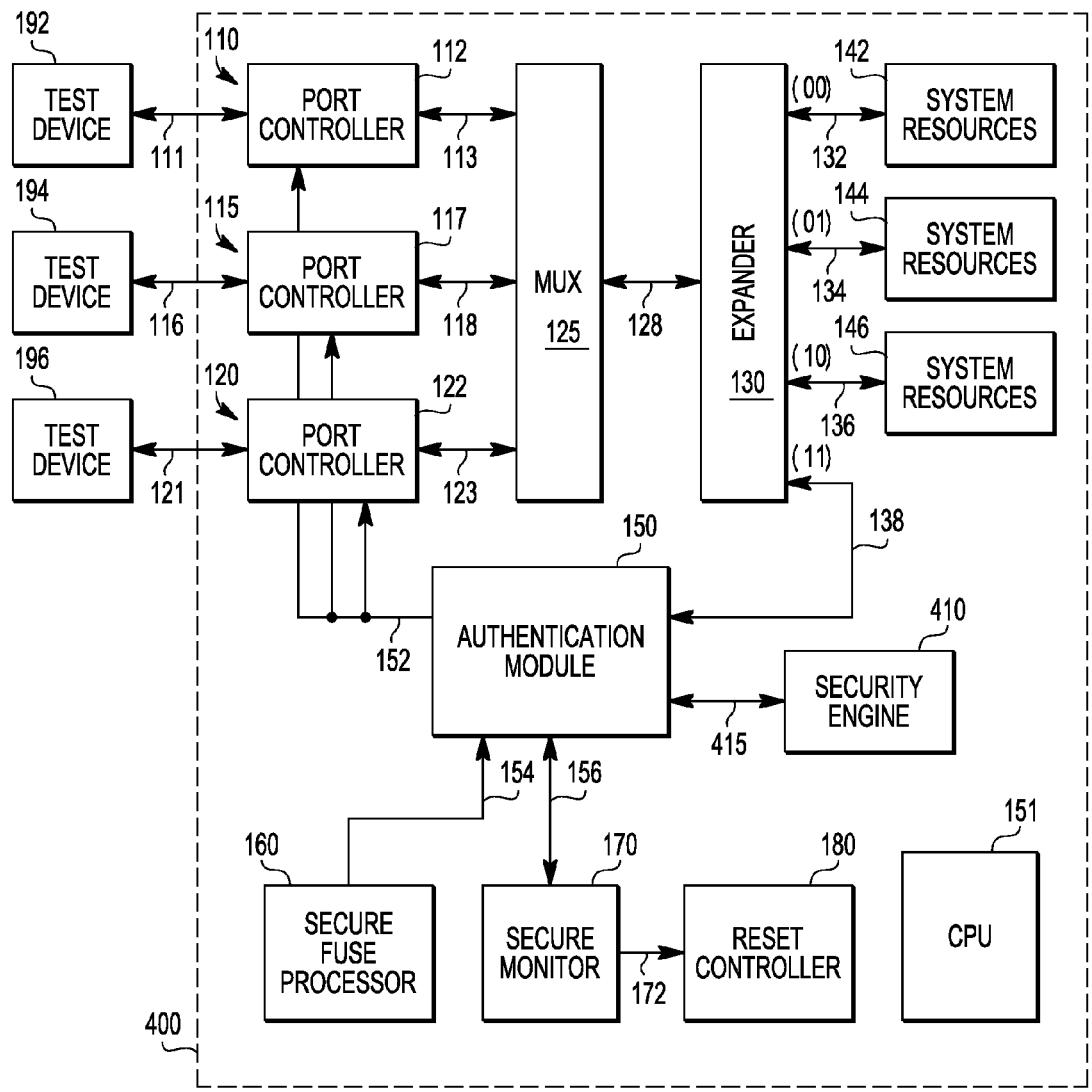
FIG. 7 is a block diagram illustrating another embodiment of a data processing device.

FIG. 7 illustrates a data processing device 400. Data processing device 400 includes the elements of data processing device 100. Also, in operation, data processing device 400 functions similarly to data processing device 100 and in addition to the functions and embodiments described above with respect to FIG. 1, data processing device 400 includes a security engine 410. Security engine 410 is connected to interconnect 415. Interconnect 415 is connected to authentication module 150. Secure processor 410 includes a security coprocessor and secure storage for cryptographic keys. In a particular embodiment, security processor 410 complies with the Trusted Computing Group standard for Trusted Platform Modules. Using security engine 410, authentication module 150 uses more advanced procedures to authenticate test devices 192, 194, and 196. For example, using a public key infrastructure (PKI), security processor 410 encrypts a challenge word with the public key of test device 192, 194, and 196, and authentication module 150 sends a challenge request that includes the encoded challenge word. Then, before sending the response word, test devices 192, 194, and 196 encrypt the response word with a public key associated with data processing device 400. When authentication module 150 receives the encrypted response word, security engine 410 decrypts the encrypted response word using the private key associated with the public key and sends the decrypted response word to authentication module 150 for comparison with an authentic response word in secure fuse processor 160. In this way, an unauthorized test device 192, 194, or 196 will be unable to authenticate onto data processing device 400 without knowing the expected encryption keys, even if an authentic response word is known.

Figure 8:
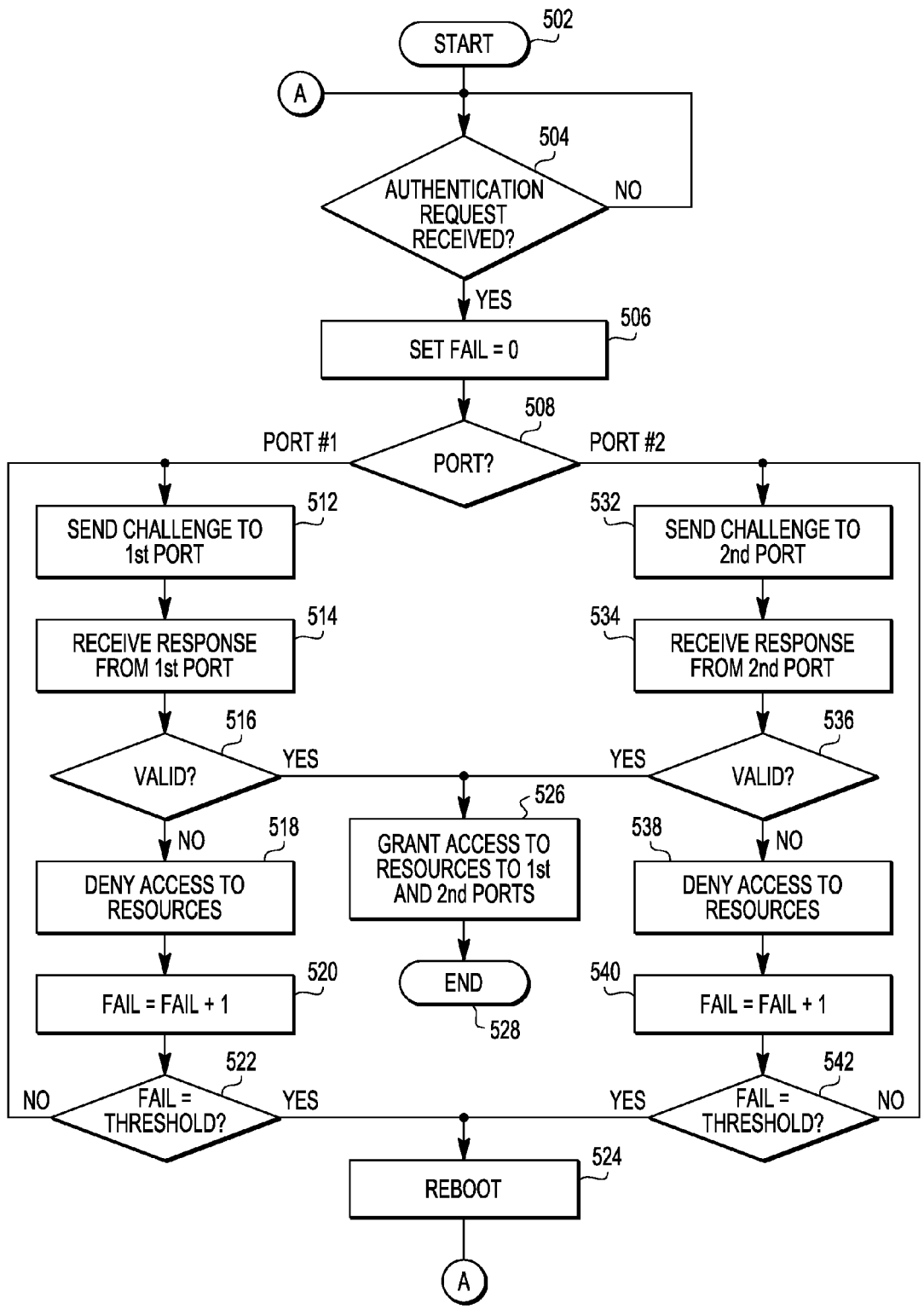
FIG. 8 is a flow chart illustrating a method of authenticating a test device onto a data processing device.

FIG. 8 illustrates a method of authenticating a test device onto a data processing device. The method starts in block 502 where no authentication request has been received. For example, port controller 112 and port controller 117 have not issued authentication requests to authentication module 150. The method proceeds to block 504, where it is determined whether an authentication request has been received, for example by receipt of an authentication request from port controller 112 or port controller 117 by authentication module 150 as previously described. If no authentication request has been received, then the "NO" branch of decision block 504 is taken, and processing continues to loop through decision block 504 until an authentication request is received.

Once an authentication request is received, the "YES" branch of decision block 504 is taken, a fail counter is set to equal zero (0) at block 506, and it is determined at decision block 508 which port generated the authentication request. If the authentication request is received from a first debug port, for example, from port controller 112, then flow proceeds to block 512. Otherwise, if the authentication request is received from a second debug port, for example, from port controller 117, then flow proceeds to block 532.

When the authentication request is from the first debug port, then a challenge is sent to the first port in block 512. For example, the challenge word at table 2 is sent from authentication module 150 to the port controller 112. In response to this, a challenge response is received from the first debug port in block 514, for example, test device 192 can send a response that includes a response word to the authentication module 150 through port controller 112. A decision is made at decision block 516 as to whether or not the challenge response is valid. For example, authentication module 150 can receive the response request from port controller 112, and can compare a response word in the response request with the authentic response words in secure fuse processor 160, as described with reference to Table 2. Authentication module 150 can then determine if the response word matches one of the authentic response words to determine if the response request is valid.

If the response is valid, the "YES" branch of decision block 516 is taken, and access to system resources is granted to the first debug port and the second debug port in block 526, and processing ends in block 528. For example, if the response request included Response_3 from Table 2, then authentication module 150 can grant debug ports 110 and 115 access to system resources 144. If the response is not valid, the "NO" branch of decision block 516 is taken and the first debug port and the second debug port are denied access to system resources in block 518. Thus authentication module 150 can prevent access to system resources for debug ports 110 and 115. The fail counter is incremented by one (1) in block 520. Here, authentication module 150 can add one (1) to the fail counter in secure monitor 170. A decision is made as to whether or not the fail counter is equal to a fail threshold in decision block 522. Secure monitor 170 can determine if the fail counter is equal to three (3), indicating that there have been three failed attempts to authenticate a debug port 110 or 115.

If the fail counter is not equal to the fail threshold, the "NO" branch of decision block 522 is taken and processing returns to block 512, where a challenge is sent to the first debug port. If the fail counter is equal to the fail threshold, the "YES" branch of decision block 522 is taken, the data processing system is reset (e.g., by rebooting the data processing system) in block 524, and processing returns to block 504, where it is determined whether an authentication request has been received. For example, authentication module 150 can send a system reset request to reset controller 180, and reset controller 180 can initiate a reset of data processing device 100.

When the authentication request received in decision block 504 is from the second debug port, then a challenge is sent to the second port in block 532. For example, the challenge word at Table 2 is sent from authentication module 150 to the port controller 117. In response to this, a challenge response is received from the second debug port in block 534, for example, test device 194 can send a response that includes a response word to the authentication module 150 through port controller 117. A decision is made at decision block 536 as to whether or not the challenge response is valid. For example, authentication module 150 can receive the response request from port controller 117, and can compare a response word in the response request with the authentic response words in secure fuse processor 160, as described with reference to Table 2. Authentication module 150 can then determine if the response word matches one of the authentic response words to determine if the response request is valid.

If the response is valid, the "YES" branch of decision block 536 is taken, and access to system resources is granted to the first debug port and the second debug port in block 526, and processing ends in block 528. For example, if the response request included Response_3 from Table 2, then authentication module 150 can grant debug ports 110 and 115 access to system resources 144. If the response is not valid, the "NO" branch of decision block 536 is taken and the first debug port and the second debug port are denied access to system resources in block 538. Thus authentication module 150 can prevent access to system resources for debug ports 110 and 115. The fail counter is incremented by one (1) in block 540. Here, authentication module 150 can add one (1) to the fail counter in secure monitor 170. A decision is made as to whether or not the fail counter is equal to a fail threshold in decision block 542. Secure monitor 170 can determine if the fail counter is equal to three (3), indicating that there have been three failed attempts to authenticate a debug port 110 or 115.

If the fail counter is not equal to the fail threshold, the "NO" branch of decision block 542 is taken and processing returns to block 532, where a challenge is sent to the second debug port. If the fail counter is equal to the fail threshold, the "YES" branch of decision block 542 is taken, the data processing system is reset in block 524 (e.g., by rebooting the data processing system), and processing returns to block 504, where it is determined whether an authentication request has been received. For example, authentication module 150 can send a system reset request to reset controller 180, and reset controller 180 can initiate a reset of data processing device 100.

It will be appreciated that the following aspects are various embodiment of the present disclosure.

In a first aspect, a method includes initiating a first authentication operation at an authentication module operable to authenticate access to the first resource by the first debug port and by the second debug port in response to receiving an authentication request at a first debug port prior to a second debug port being authenticated to access a first resource of a data processor, and initiating a second authentication operation at the authentication module operable to authenticate access to the first resource by the first debug port and by the second debug port in response to receiving an authentication request at the second debug port prior to the first debug port being authenticated to access the first resource.

In an embodiment of the first aspect, the first authentication operation includes sending a first challenge from the authentication module to the first debug port, receiving a first response that is responsive to the first challenge at the authentication module from the first debug port, and providing first information from the authentication module to authenticate access to the first resource by the first debug module and by the second debug module in response to determining that the first response is a first valid response. In another embodiment, access to a second resource by the first debug port or by the second debug port is not authenticated in response to the first valid response, and the method includes performing a third authentication operation at the authentication module in response to receiving an authentication request at the first debug port subsequent to providing the first information, and authenticating access to the second resource by the first debug port in response to determining that a second valid response has been received from the first debug port.

In another embodiment of the first aspect, authentication access to the second resource by the second debug port is not provided in response to the third authentication operation determining the second valid response has been received. In still another embodiment, authentication access to the second resource by the second debug port is also provided in response to the third authentication operation determining the second valid response has been received. In yet another embodiment, the second authentication operation also includes sending a second challenge from the authentication module to the second debug port, receiving a second response at the authentication module from the second debug port where the second response is responsive to the second challenge, and providing the first information from the authentication module to authenticate access to the first resource by the first debug module and by the second debug module in response to determining that the first response is the first valid response. In a further embodiment, the method includes providing the first information from the authentication module to authenticate access to the first resource by the first debug module and by the second debug module in response to determining that the first response is a second valid response, and providing second information from the authentication module to authenticate access to a second resource by the first debug module but not by the second debug module, in response to determining that the first response is the second valid response.

In a second aspect, a method includes providing a first address mapped access request to a first address from a first debug port of an integrated circuit, the integrated circuit including a plurality of resources mapped to a first address space, the plurality of resources including an authentication module that is mapped to the first address of the first address space, and initiating a first authentication operation at the authentication module to authenticate access to a first resource by the first debug port in response to the first address mapped access request being received at the authentication module by virtue of the authentication module being address mapped to the first address.

In an embodiment of the second aspect, the first authentication operation is to further authenticate access to the first resource by a second debug port in response to the first address mapped access request. In another embodiment, the method also includes providing a second address mapped access request to the first address from the first debug port after authenticating the first debug port to access the first resource, providing a second address mapped access request to the first address from the first debug port, and initiating a second authentication operation at the authentication module to authenticate access to a second resource in response to the second address mapped access request. In still another embodiment, the second authentication operation authenticates access to the second resource by the first debug port and does not provide access to the second resource by the second debug port.

In another embodiment of the second aspect, the second authentication operation authenticates access to the second resource by the first debug port and access to the second resource by the second debug port. In another embodiment, the method also includes receiving at the first debug port a debug access request from a test device prior to providing the first address mapped access request to the first address, and providing the first address mapped access request to the first address is in response to receiving the debug access request. In still another embodiment, the debug access request from the test device includes the first address. In yet another embodiment, the debug access request from the test device does not include the first address. In another embodiment, the debug access request includes an instruction identifier that is decoded by the first debug port into the first address mapped access request.

In a third aspect, a device includes a first test port operably coupleable to a first test device, a second test port operably coupleable to a second test device, a first resource, and a security controller coupled to the first test port and to the second test port, and the security controller is operable to authenticate the first test device prior to authenticating the second test device and permit the first test device and the second test device to access the first resource in response to authenticating the first test device. In an embodiment of the third aspect, the security controller is also operable to authenticate the second test device prior to authenticating the first test device, and permit the first test device and the second test device to access the first resource in response to authenticating the second test device. In another embodiment, the device also includes a third test port operably coupleable to a third test device, and the security controller is also operable to authenticate the first test device prior to authenticating the third test device, and permit the first test device and the third test device to access the first resource in response to authenticating the first test device. In yet another embodiment, the first test port includes a boundary scan architecture port.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:

receiving at a first debug port of a data processing device a first authentication request, the first authentication request being received prior to a second debug port of the data processing device being authenticated to access a first resource of the data processing device;

in response to receiving the first authentication request, initiating a first authentication operation at an authentication module, wherein the first authentication operation authenticates access to the first resource by the first debug port and by the second debug port, wherein the first authentication operation comprises:

sending a first challenge from the authentication module to the first debug port;

receiving a first response at the authentication module from the first debug port, the first response responsive to the first challenge;

providing first information from the authentication module to authenticate access to the first resource by the first debug port and by the second debug port, in response to determining that the first response is a first valid response; and providing the first information from the authentication module to authenticate access to the first resource by the first debug port and by the second debug port in response to determining that the first response is a second valid response;

receiving at the second debug port of the data processing device a second authentication request, the second authentication request being received prior to the first debug port being authenticated to access the first resource; and in response to receiving the second authentication request, initiating a second authentication operation at the authentication module, wherein the second authentication operation authenticates access to the first resource by the first debug port and by the second debug port.

2. The method of claim 1, wherein access to a second resource by the first debug port or by the second debug port is not authenticated in response to the first valid response, and performing a third authentication operation at the authentication module in response to receiving an authentication request at the first debug port subsequent to providing the first information, and authenticating access to the second resource by the first debug port in response to determining that a second valid response has been received from the first debug port.

3. The method of claim 2, wherein authentication access to the second resource by the second debug port is not provided in response to the third authentication operation determining the second valid response has been received.

4. The method of claim 2, wherein authentication access to the second resource by the second debug port is also provided in response to the third authentication operation determining the second valid response has been received.

5. The method of claim 1, wherein the second authentication operation further comprises:

sending a second challenge from the authentication module to the second debug port;

receiving a second response at the authentication module from the second debug port, the second response responsive to the second challenge; and providing the first information from the authentication module to authenticate access to the first resource by the first debug port and by the second debug port, in response to determining that the first response is the first valid response.

6. The method of claim 5, further comprising:

providing second information from the authentication module to authenticate access to a second resource by the first debug port but not by the second debug port, in response to determining that the first response is the second valid response.

7. A method comprising:

providing a first address mapped access request to a first address from a first debug port of an integrated circuit, the integrated circuit including a plurality of resources mapped to a first address space, the plurality of resources including an authentication module that is address mapped to the first address of the first address space;

initiating a first authentication operation at the authentication module to authenticate access to a first resource by the first debug port in response to the first address mapped access request being received at the authentication module by virtue of the authentication module being address mapped to the first address;

receiving at the first debug port a debug access request from a test device prior to providing the first address mapped access request to the first address; and providing the first address mapped access request to the first address is in response to receiving the debug access request.

8. The method of claim 7, wherein the first authentication operation is to further authenticate access to the first resource by a second debug port in response to the first address mapped access request.

9. The method of claim 8, further comprising:

subsequent to authenticating the first debug port to access the first resource, providing a second address mapped access request to the first address from the first debug port; and initiating a second authentication operation at the authentication module to authenticate access to a second resource in response to the second address mapped access request.

10. The method of claim 9, wherein the second authentication operation authenticates access to the second resource by the first debug port and does not provide access to the second resource by the second debug port.

11. The method of claim 9, wherein the second authentication operation authenticates access to the second resource by the first debug port and access to the second resource by the second debug port.

12. The method of claim 7, wherein the debug access request from the test device includes the first address.

13. The method of claim 7, wherein the debug access request from the test device does not include the first address.

14. The method of claim 13, wherein the debug access request includes an instruction identifier that is decoded by the first debug port into the first address mapped access request.

15. A device comprising:

a first test port;

a second test port;

a first resource; and a security controller coupled to the first test port and to the second test port; and wherein the security controller:

authenticates a first test device coupled to the first test port prior to authenticating a second test device coupled to the second test port, wherein in authenticating the first test device, the security controller:

sends a challenge to the first debug port;

receives a response from the first debug port; and provides information to authenticate access to the first resource by the first debug port and by the second debug port, in response to determining that the first response is a first valid response; and in response to authenticating the first test device, permits the first test device and the second test device to access the first resource.

16. The device of claim 15, wherein the security controller further:

authenticates the second test device prior to authenticating the first test device; and in response to authenticating the second test device, permits the first test device and the second test device to access the first resource.

17. The device of claim 15, further comprising:

a third test port; and wherein the security controller further:

authenticates the first test device prior to authenticating a third test device coupled to the third test port; and in response to authenticating the first test device, permits the first test device and the third test device to access the first resource.

18. The device of claim 15, wherein the first test port includes a boundary scan architecture port.

* * * * *